United States Patent [19]

Snyder et al.

[11] Patent Number: 5,261,497
[45] Date of Patent: Nov. 16, 1993

[54] MULTIPLE IMPLEMENT HITCH AND STEERABLE WHEEL ASSEMBLY THEREFOR

[75] Inventors: Michael D. Snyder, Bettendorf; John D. Long, Ankeny; Daniel M. Foley, Des Moines, all of Iowa

[73] Assignee: Deere & Company, Moline, Ill.

[21] Appl. No.: 876,238

[22] Filed: Apr. 30, 1992

[51] Int. Cl.$^5$ .............................................. A01B 63/14
[52] U.S. Cl. ................................... 172/313; 172/311; 172/284; 172/383; 280/412; 280/92
[58] Field of Search ............... 172/313, 310, 311, 282, 172/248, 289, 776, 669, 383, 385; 280/412, 413, 473, 92

[56] References Cited

U.S. PATENT DOCUMENTS

| | | |
|---|---|---|
| 2,869,895 | 1/1959 | Tkachyk et al. . |
| 3,008,446 | 11/1961 | Quayle ................... 280/92 |
| 3,112,124 | 11/1963 | Bartel ..................... 280/412 |
| 3,721,280 | 3/1973 | French et al. . |
| 3,738,682 | 6/1973 | Ritter . |
| 4,178,010 | 12/1979 | Gerber ..................... 280/412 |
| 4,213,628 | 7/1980 | Hardesty . |
| 4,272,097 | 6/1981 | Cornelius . |
| 4,282,935 | 8/1981 | Dietrich ................... 172/284 |
| 4,346,909 | 8/1982 | Hindeby ................... 280/412 |
| 4,381,118 | 4/1983 | Weeks . |
| 4,577,881 | 3/1986 | Gerber . |
| 4,875,421 | 10/1989 | Hadley . |
| 4,875,527 | 10/1989 | Foley et al. . |
| 5,024,456 | 6/1991 | Hadley et al. . |
| 5,031,394 | 7/1991 | Honey ..................... 280/412 |

FOREIGN PATENT DOCUMENTS

85/02971  7/1985  World Int. Prop. O. .......... 172/311

OTHER PUBLICATIONS

*Successful Farming Magazine*, "Double Play", mid-March 1992.

Primary Examiner—Randolph A. Reese
Assistant Examiner—Spencer Warnick

[57] ABSTRACT

Hitch structure for connecting first and second implements for operation side-by-side in the field, and one directly behind the other for transport. A freely rockable swing hitch has a forward end connected to one side of the first implement frame for pivoting less than 180° about an upright axis located inwardly from the side. A latch on the swing hitch mates with a frame-mounted rear bracket to secure the hitch in the transport position. The same latch secures the swing hitch to a bracket on the forward towing hitch when the swing hitch and towing hitch are in the field-working position. A sliding tubular member and two-position latch selectively secure the towing hitch in either a central transport position or an offset field-working position. Both latches have release levers for changing from one position to the other, and the latches automatically lock in the new position when the desired position is attained. A steering mechanism located on the caster wheel assembly of the trailing implement and operable from the tractor cab guides the second implement as the swing hitch pivots during conversions.

27 Claims, 7 Drawing Sheets

MULTIPLE IMPLEMENT HITCH AND STEERABLE WHEEL ASSEMBLY THEREFOR

BACKGROUND OF THE INVENTION

1. Field of the Invention

The present invention relates generally to implement hitches and more specifically to hitches for towing two implements side-by-side in the field and one behind the other during transport.

2. Related Art

Hitches for increasing productivity by towing two or more individual implements in transversely spaced relation behind a tractor have become increasingly popular. To narrow the resulting unit for road transport, the hitches are designed to permit the implements to be towed one behind the other. Examples of such hitches are shown in U.S. Pat. Nos. 4,178,010; 4,213,628; 4,577,881; 4,875,527; and 5,024,456.

Many of the hitches that remain connected to the tractor during conversions do not permit in-line transverse positioning of the implements so that skips during turns and less convenient hopper filling are problems. The available hitches that require disconnection from the tractor during conversion between field-working and transport positions are inconvenient to work with, and several trips on and off the tractor are required to operate latches and make numerous connections and disconnections of hoses and electrical cables. A minimum of three or four unlatching and latching operations may be required for release and subsequent resecuring of the various hitch and brace structures during a conversion between field-working and transport positions.

Some hitches require a large space and several maneuvers, such as driving in a circle and reversing direction, to achieve the desired conversion. With those that have passive or freely swinging hitches, there is little control of the trailing implement during conversion between the transport and field-working positions. Therefore, conversions can result in a large area of packed wheel tracks and can be difficult, especially when the ground is soft, sloping or irregular and when the towed implements are carrying a substantial amount of grain or fertilizer.

On many of the available two-unit hitches, an additional relatively large rectangular frame is used with the forward hitch structure connected to the tractor. This frame often is heavy and unsightly and reduces clearance and accessibility near at least one front side of the structure. Side protruding hitch structure can limit close spacing of implements in the field-working position so that row spacing is adversely affected. With other hitches, manual movement of heavy hitch components may be necessary.

BRIEF SUMMARY OF THE INVENTION

It is therefore an object of the invention to provide an improved multiple implement hitch. It is a further object to provide such a hitch which overcomes many or all of the aforementioned problems with previously available hitches.

It is a further object to provide an improved multiple implement hitch wherein the tractor remains connected to the hitch during conversions between field-working and transport positions, and wherein the conversations can be made quickly and easily without need for the operator to leave the tractor more than once. It is yet another object to provide such a hitch which requires fewer unlatching and latching operations than with at least most previously available hitches.

Is another object to provide an improved multiple implement hitch wherein the individual implements are more easily accessible than with most previously available hitches. It is another object to provide such a hitch which reduces time and space requirements for conversions between field-working and transport positions and which maintains good control over the trailing implement, even when heavily loaded and in soft, rough or sloping ground conditions.

It is another object of the present invention to provide an improved multiple implement hitch wherein at least one of the implements is positively steered so that maneuverability of the implements between field-working and transport positions is significantly improved over that available with at least most previous hitch arrangements, even when the implements are heavily loaded or when the conversion is made on other than a hard, level ground surface. It is another object to provide such a hitch wherein conversions between positions are accomplished in a small area without need for hydraulic folding cylinders and wherein good load distribution is achieved in a compact package with only a few additional frame components on a standard implement frame.

It is yet another object to provide a steerable caster wheel structure and steering control for a multiple implement hitch for easier and more controlled conversions between field-working and transport positions. It is a further object to provide such a steering control that facilitates normal caster action after conversion is complete.

Another object of the present invention is to provide an improved latching arrangement for a multiple implement hitch.

Hitch structure is provided for connecting first and second implements such as grain drills for operation side-by-side in the field, and one directly behind the other for transport. A freely rockable swing hitch has a forward end connected to one side of the first implement frame for pivoting less than 180° but substantially greater than 90° about an upright axis located inwardly from the side. In the transport position, the swing hitch extends rearwardly from a location outside the pivot and doglegs or bends inwardly and rearwardly behind the corresponding rear corner of the frame to a connection with the second implement such that the second implement is centered directly behind the first. A latch on the swing hitch located at the bend location mates with a frame-mounted rear bracket to secure the hitch in the transport position. The same latch is utilized to secure the swing hitch to a bracket on the forward towing hitch when the swing hitch is in the field-working position. A sliding tubular member and a two-position latch are used to selectively secure the forward towing hitch in either a central transport position or an offset field-working position. Both latches have release levers for changing from one position to the other, and the latches automatically lock in the new position. Only two latch operations are required since locking occurs automatically when the desired position is attained. The tubular member also acts as a brace to help distribute loads more uniformly.

The caster wheel assembly of the second or trailing implement includes a remotely controllable steering mechanism to positively guide the second implement as the swing hitch pivots during conversions. A control in the tractor cab allows the operator to position the caster wheel of the trailing implement for easy conversions in a short distance, even when the implements are loaded or on rough or sloping ground. The control also facilitates normal caster action in either hitch position.

The forward and swing hitches and sliding tube or hitch brace are advantageously located relative to the first or forward implement frame to assure a simple, compact design with good towing characteristics and easy access to the implements for conversions, maintenance and filling of the machines with material such as seed and fertilizer. The swing hitch, towing hitch and towing hitch brace optimize transfer of forces through the hitch and existing implement frames in both hitch positions and provide a compact structure that further aids access to the implements. The location of the swing hitch pivot inwardly from the side of the first implement permits the units to be supported closely adjacent each other and in-line with each other in the field-working position. Controlled conversions are made without need for hydraulically powered hitches.

These and other objects, features and advantages of the present invention will become apparent to one skilled in the art upon reading the following detailed description in view of the drawings.

DETAILED DESCRIPTION OF THE DRAWINGS

Figure 1:
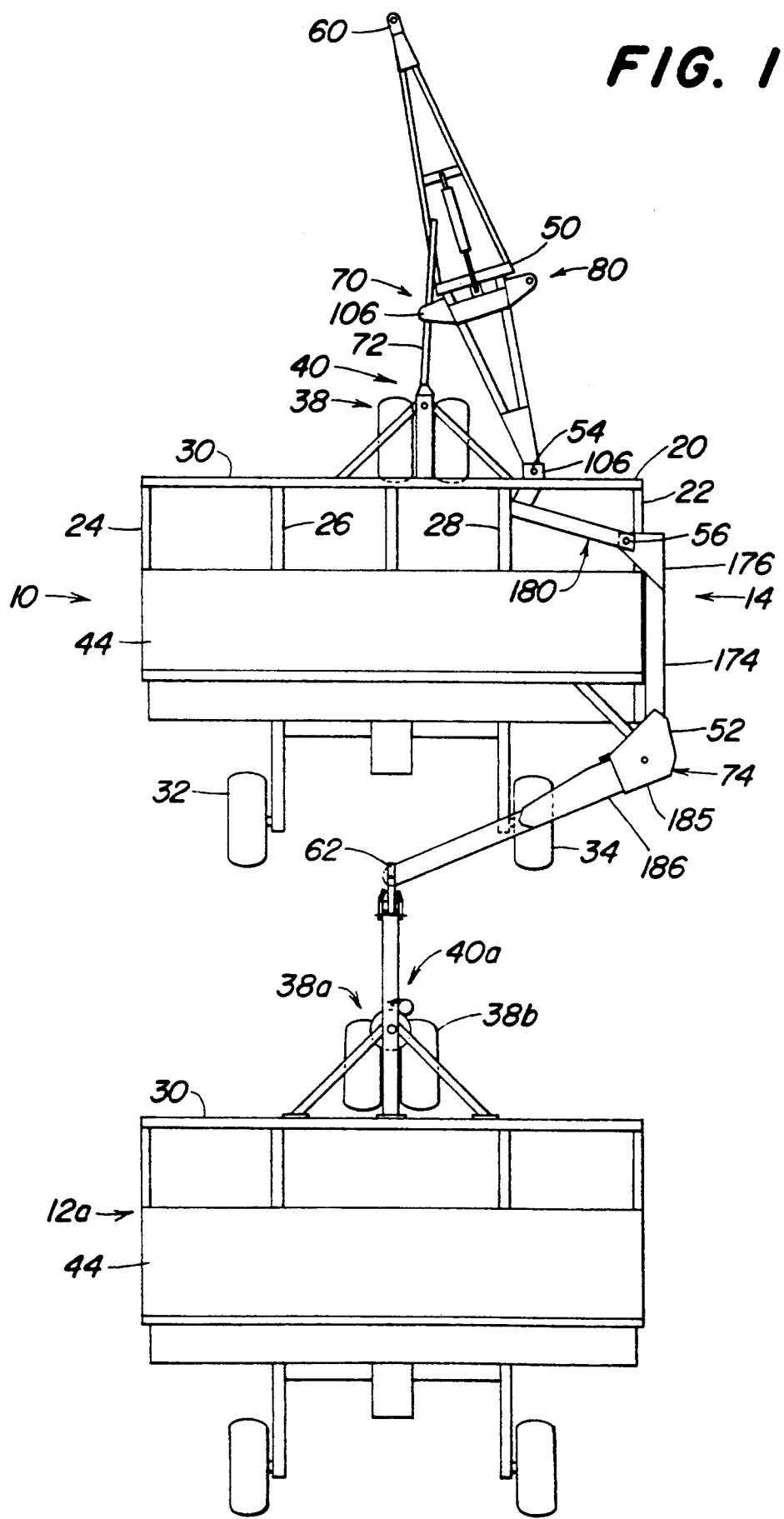
FIG. 1 is a top view of a two unit implement hitch shown in the transport position with the implements one behind the other.

Referring now to FIG. 1, therein is shown a first or leading implement 10 and a second or trailing implement 12 connected by a towing hitch structure 14 to each other and to a towing vehicle such as a tractor (not shown) for forward movement over the ground. The towing hitch structure 14 positions the implements 10 and 12 one directly behind the other (FIG. 1) for transport and one beside the other, in line (FIG. 3), for operation in the field.

The implements 10 and 12 as shown are grain drills generally of the type shown in U.S. Pat. No. 4,875,421 although other types of implements may be used as well with the hitch structure 14. The implement 10 includes a generally rectangular shaped main frame 20 with side frame members 22 and 24 and fore-and-aft extending center frame members 26 and 28. A transversely extending forward frame member 30 extends between the forward ends of the side frame members 22 and 24. Rear ground support wheels 32 and 34 are connected to the aft ends of the frame members 26 and 28. A forward caster wheel assembly 38 is supported from the front of hitch 40 fixed to the frame member 20 and permits the implement 10 to be turned. Fertilizer and/or grain boxes 44 are supported on the frame 20. A similar frame and support structure is utilized with the trailing implement 12.

Figure 2:
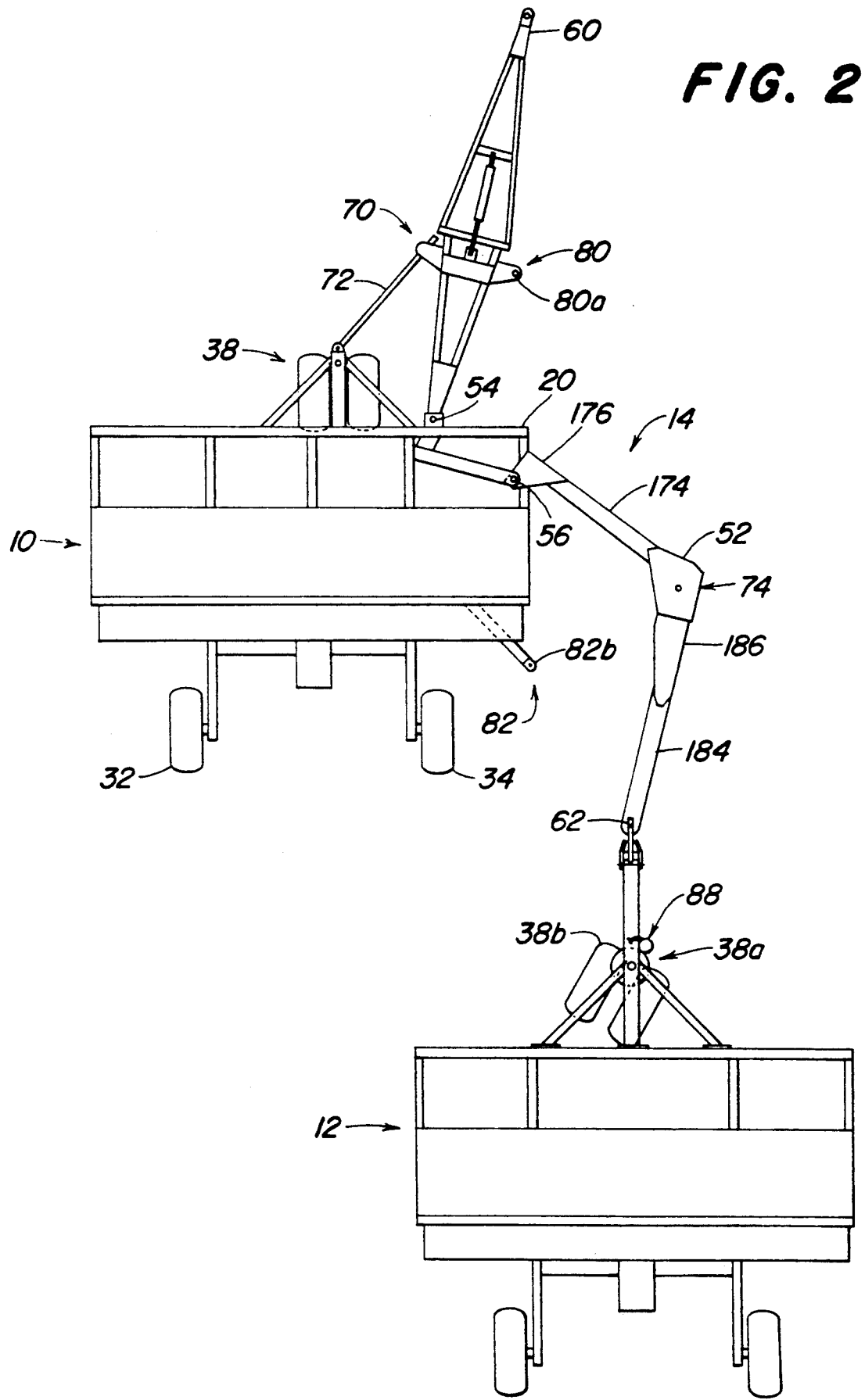
FIG. 2 is a view similar to FIG. 1 but showing the trailing implement in transition between positions with the caster wheel assembly steered to facilitate relative movement of the implements.

The hitch structure 14 includes a forward towing hitch 50 and a rear swing hitch 52 which are pivotally connected to the frame 20 at transversely offset locations near one front corner 20c of the frame 20 (the right front corner as shown in the FIGS. 1-3) for rocking about upright axes 54 and 56, respectively, between transport (FIG. 1) and field-working (FIG. 3) positions. The towing hitch 50 includes a vertically adjustable forward section with a forward connector 60 adapted for attachment to the tractor. The swing hitch 52 includes a rear or outermost connecting end 62 attached to the forward end of the hitch 40a on the trailing implement 12. A first or forward latch 70 slidingly receives a tube 72 and selectively locks the front hitch 50 in either the transport (FIG. 1) or field-working (FIG. 3) positions by trapping preselected portions of the tube 72. A second or rear latch 74 located at a bend location in the swing hitch 52 automatically locks the swing hitch 52 in either the field-working or the transport position by mating with receiving brackets 80 or 82, respectively (see FIG. 2) on the front hitch 50 and the rear of the main frame 20. The latches 70 and 74, as described in detail below, can be set to release the hitches 50 and 52 from the position they are in, and when the opposite position is assumed, the latches will automatically lock so the operator only has to make one trip off the tractor during a conversion.

Figure 5:
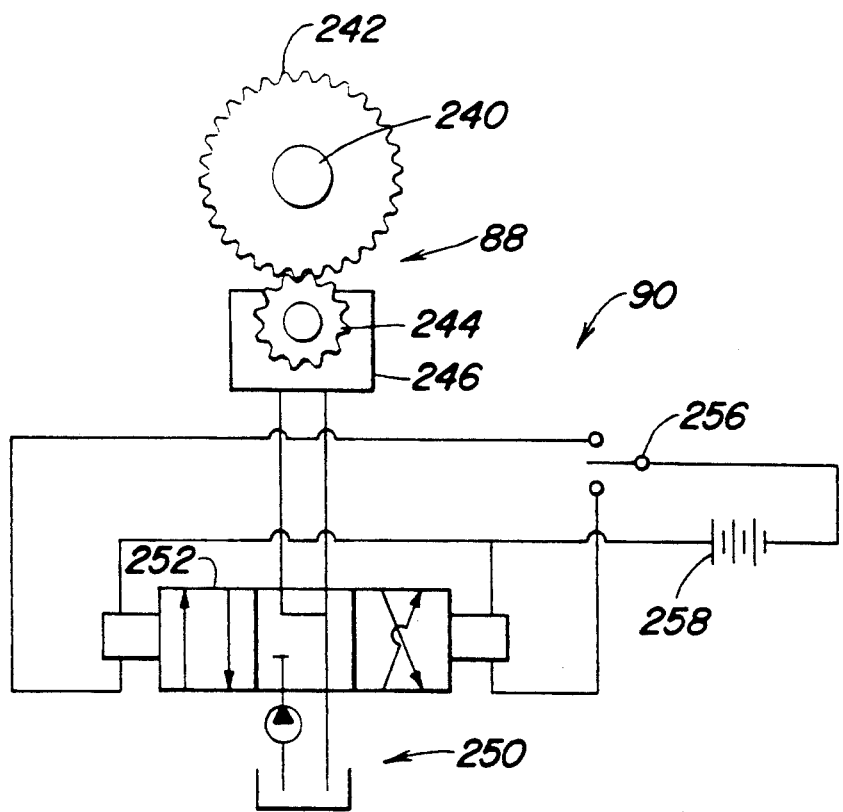
FIG. 5 is a schematic representation of the steering arrangement including the steering control for the wheel assembly of FIG. 4.

The rear caster wheel assembly 38a is steerable positively by a selectively engageable drive assembly 88 (FIG. 2) during conversion between transport and field-working positions. A control circuit 90 (FIG. 5) permits remote steering of the caster wheel assembly 38a from the tractor cab during conversions. Once the implement 12 is steered into position relative to the implement 10, the caster wheels are allowed to freely rotate about the upright caster axis.

The forward towing hitch 50 is connected by a pivot bracket 104 (FIG. 1) to the front of the frame 20 for rocking about the axis 54 while maintaining the hitch 50 in a position offset above the ground. The pivot 54 located midway between the center of the frame 20 and the sideframe member 22. A centrally located bracket 106 extending outwardly toward the left as viewed if FIGS. 1 and 6 supports the latch 70 and guides the tube 72 as the tube moves between opposing latching positions during conversions. The hitch 40 from which the tube 72 pivots is generally of conventional construction but is offset toward the right as viewed in FIG. 1 so that the caster wheels of the assembly 38 are offset from the fore-and-aft centerline 39 of the implement 10 toward the hitch side to provide better load distribution on the wheels.

Figure 6:
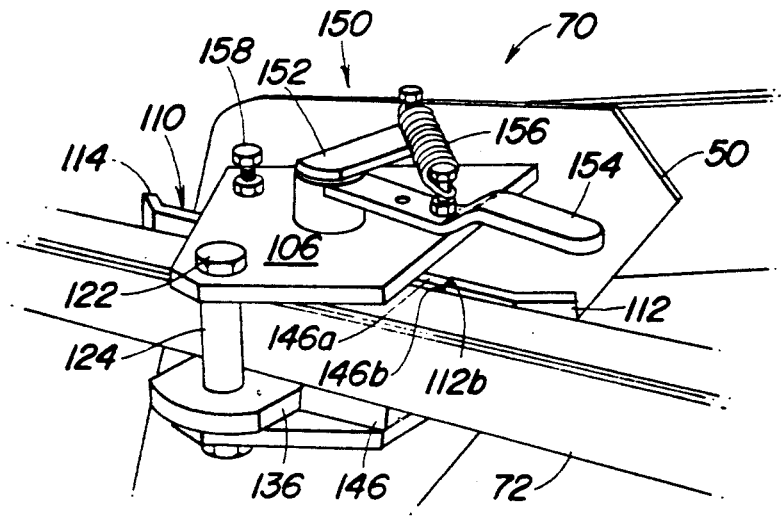
FIG. 6 is a perspective view of the forward hitch latch in the transport position.
Figure 7:
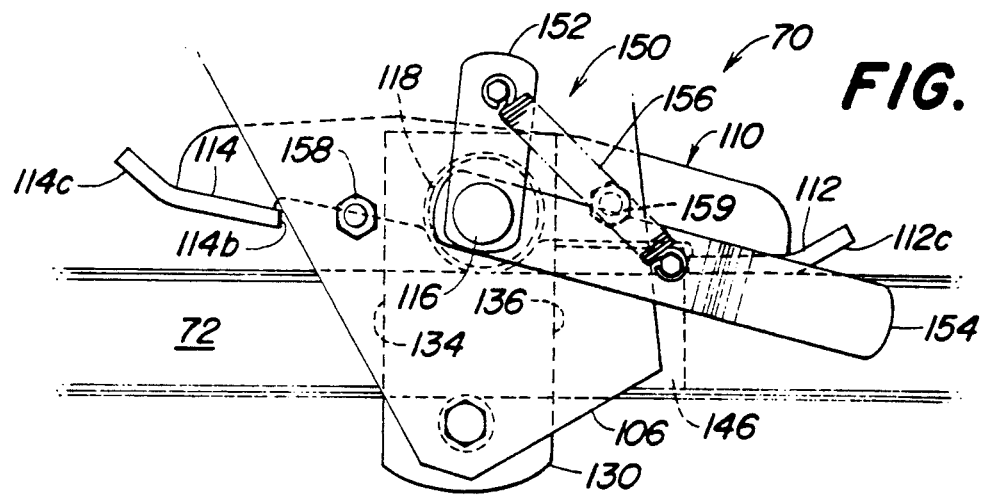
FIG. 7 is a top view of the forward hitch latch in the transport position.
Figure 8:
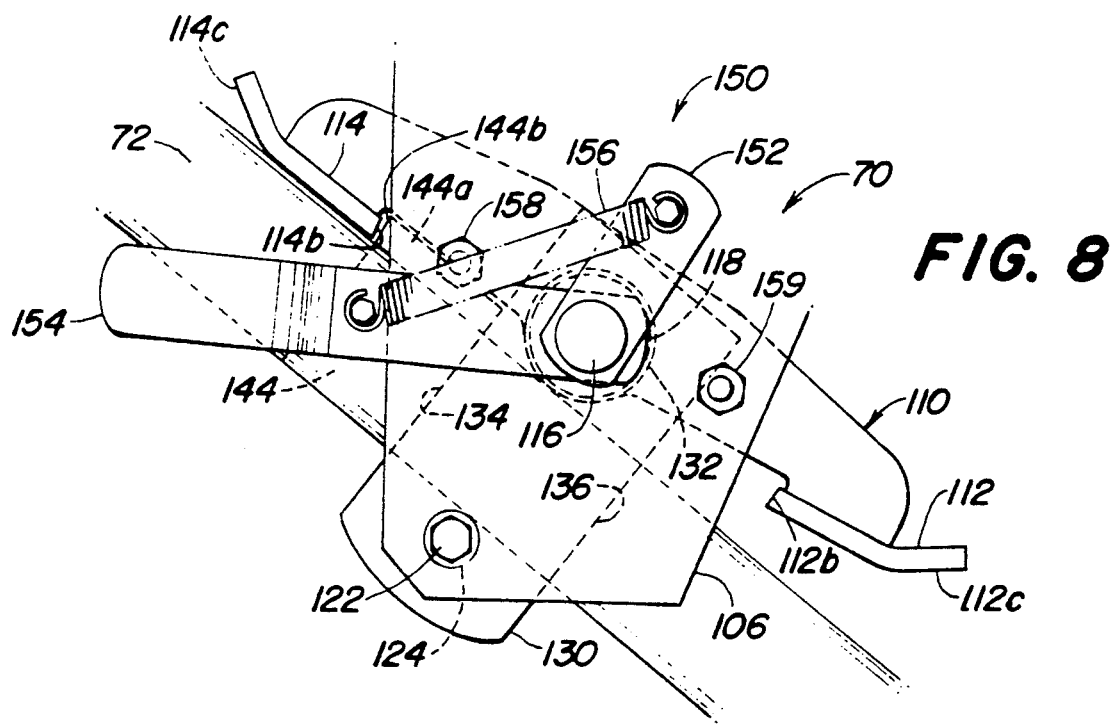
FIG. 8 is a view similar to FIG. 7 but showing the latch in the field-working position.

The latch 70, as best seen in FIGS. 6-8, includes pivoting locking member 110 with a transport lock end 112 and a field lock end 114 located on opposite sides of a central upright pivot 116. The pivot 116 and surrounding bushing 118 is supported within the bracket 106 on one side of the sliding tube 72. A pin 122 supports a bushing 124 within the bracket 106 on the opposite side of the tube 72 to maintain the tube within the bracket. A stop bar 130 is pivotally connected within the bracket 106 to the lower portion of the pivot 122 and extends under the tube 72 to an end with an enlarged aperture 132 which receives the pivot 116. The stop bar 130 includes forward and aft edges 134 and 136. The edges 134 and 136 are maintained generally perpendicular to the tube 72 as the tube angle changes with pivoting of the front hitch 50.

Metal angles 144 and 146 are secured to the underside and latch side of the tube 72. The lower flange of the angle 144 contacts the edge 134 (FIG. 8) to establish a limit position and prevent sliding of the tube rearwardly out of the bracket 106 as the forward hitch 50 pivots to the right (FIG. 1) into the transport position. The lower flange of the angle 146 contacts the edge 136 (FIGS. 6 and 7) to establish a second limit position and prevent forward sliding of the tube 72 within the bracket 106 beyond the field-working position.

The angle 144 includes an upwardly directed flange 144a having a forwardly directed edge 144b with a bevel of about 5° toward the left in the upward direction as viewed in FIGS. 7 and 8. A mating bevelled edge 144b on the locking member end 114 positively secures the tube in the field-working position (FIG. 8) by preventing the tube 72 from sliding forwardly in the bracket 106. Similar but oppositely directed bevelled edges 112b and 146b on the end 112 and angle flange 146a, respectively, secure the tube 72 against forward sliding within the bracket 106 in the transport position of FIGS. 6 and 7. The bevelled edges prevent inadvertent release of the latch 70 under heavy loading.

The locking member 110 of the latch 70 is biased toward the desired position by an over-center latch handle assembly 150 (FIGS. 6-8). An arm 152 is fixed to and extends radially from the pivot 116 for rocking with the member 110. A handle 154 is pivotally connected to the bracket 106 for rocking about an upright axis between transport (FIG. 7) and field-working (FIG. 8) latching positions. A spring 156 is tensioned between the central portion of the handle 154 and the outer end of the arm 152 for biasing the member either in the clockwise or counterclockwise direction depending on handle position. Stops 158 and 159 limit the rotation of the handle 152 beyond the latching positions. Ramp surfaces 112c and 114c on the outer ends 112 and 114 of the locking member 110 allow the upright flange 144a or 146a to push the corresponding end of the member 110 against the bias and slide into the locking position.

In the transport position shown in FIGS. 1, 6 and 7, the spring 156 biases the end 112 against the tube 72 to prevent the tube from sliding rearwardly within the bracket 106, thereby maintaining the forward hitch 50 in the counterclockwise position of FIG. 1. The edge 136 of the pivoting stop 130 contacts the angle 146 and prevents the hitch 50 from pivoting in the counterclockwise position shown in FIG. 1, for example, when the tractor decelerates or turns to the left during transport.

Figure 3:
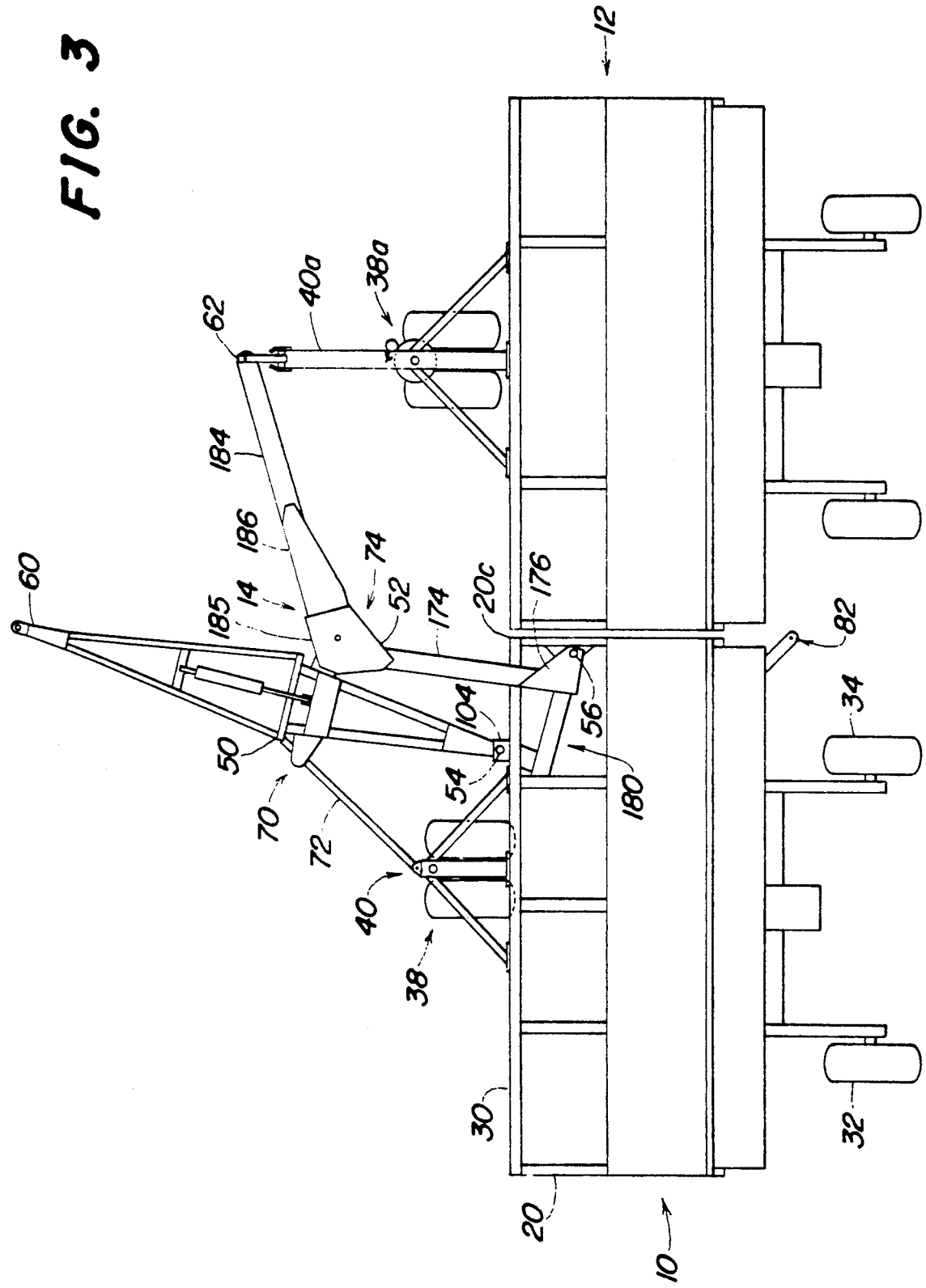
FIG. 3 is a view similar to FIGS. 1 and 2 but showing the implements in line in the field-working position.

In the field-working position of FIGS. 3 and 8, the spring 156 biases the end 114 against the tube 72 to secure the tube against sliding forwardly within the bracket 106 from the position wherein the edges 114b and 144b are in locking relationship with each other. The tube 72 thereby maintains the forward hitch 50 in the clockwise-most position of FIG. 3. The edge 134 of the pivoting stop 130 contacts the angle 144 to prevent the hitch 50 from pivoting in the clockwise direction beyond the position shown in FIG. 3, for example, during conversion from the transport position. Once the handle 154 is moved to release the latch 70 (that is, in FIG. 7 to the counterclockwise most position shown to the clockwise-most position shown in FIG. 8) the end (114 or 112) that is trapping the flange (144a or 146a) will be biased away from the tube 72 by the spring 156 and the opposite end will be biased toward the tube 72 to trap the opposite flange as the tube slides in the bracket 106 during conversion. Therefore, the lever 154 has to be flipped only once during each conversion.

The swing hitch 52 includes a forward tube 174 with a forward bracket 176 supporting the hitch for rocking above the frame 20 of the forward implement 10 about the upright axis 56. The bracket 176 offsets the longitudinal axis of the tube 174 outwardly from the axis 56 (FIG. 1) in the transport position of the hitch. Upon forward rotation of the hitch 52 about the axis 56 toward the field-working position (FIG. 3), the offset pivot location of the bracket 176 moves the tube 174 inwardly from the side of the frame 20 to permit the trailing implement 12 to be positioned close alongside the forward implement without any interference from the hitch 14. Brace structure 180 is added between the forward hitch bracket 104 and the bracket 176 for increased strength and positional stability of the upright axes 54 and 56, and for improved load transfer through the frame. The aft portion of the hitch 50 and the tube 174 of the hitch 52 are held in generally horizontal positions by the brackets 106 and 176.

Adjacent the latch 74, a rear leg 184 is pivotally connected to the tube by a fixed bracket 185 and a pivot bracket 186 for rocking about a generally horizontal axis perpendicular to the leg 184. The leg 184 extends to the connecting end 62 and is supported above the ground by the hitch 40a. The brackets 185 and 186 maintain a constant angular relationship between the tube 174 and arm 184 (the angle being substantially greater than 90°) for establishing the desired relative implement positions while permitting vertical movement of the hitch 40a relative to the frame of the front implement 10 to accommodate movement over uneven ground surfaces.

Figure 9:
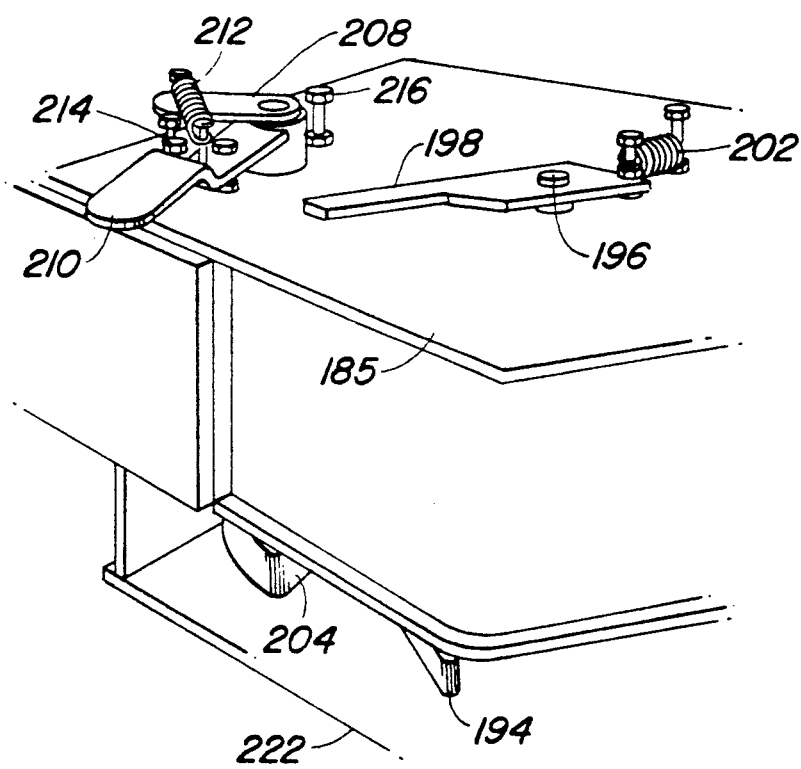
FIG. 9 is a perspective view of the swing hitch latch set for automatic latching in either of the hitch positions.

The latch 74 includes a double-ended latch plate 194 (FIGS. 10 and 11) pivotally connected for rocking about an upright axis below the lower plate 185a of the bracket 185. The latch plate 194 is fixed to the lower end of a pivot shaft 196 which extends upwardly through the bracket 185 to a connection with lever 198. A spring 202 (FIGS. 9 and 10) connected between one end of the lever 198 and a pin on the bracket top plate 185b biases the latch plate 194 in the counterclockwise direction toward a release position (broken lines of FIG. 10). A hook 204 which selectively secures the latch plate in the locked position (solid lines of FIG. 10) is fixed to the lower end of an upright pivot shaft 206 which projects up through the bracket 185. An arm 208 is fixed to the upper end of the shaft 206. A release handle 210 is mounted for rotation on the upper end of the shaft 206, and a spring 212 is tensioned between the outer end of the arm 208 and the central portion of the lever 210. The handle 210 has a clockwise latching position (FIG. 10) wherein the spring biases the arm 208 and hook 204 such that the hook engages the latch plate 194 to maintain the latch plate in the locked position (solid lines of FIG. 10). A stop 214 prevents the handle from pivoting in the clockwise direction beyond the position shown in FIGS. 9 and 11. A second stop 216 limits the counterclockwise pivoting of the handle 210 to a release position wherein the arm 208 and hook 204 are biased by the spring 212 in the clockwise direction to release the latch plate 194 from the hook 204. Upon release, the latch plate 194 is free to rotate toward the position shown by the broken lines in FIG. 10.

Figure 10:
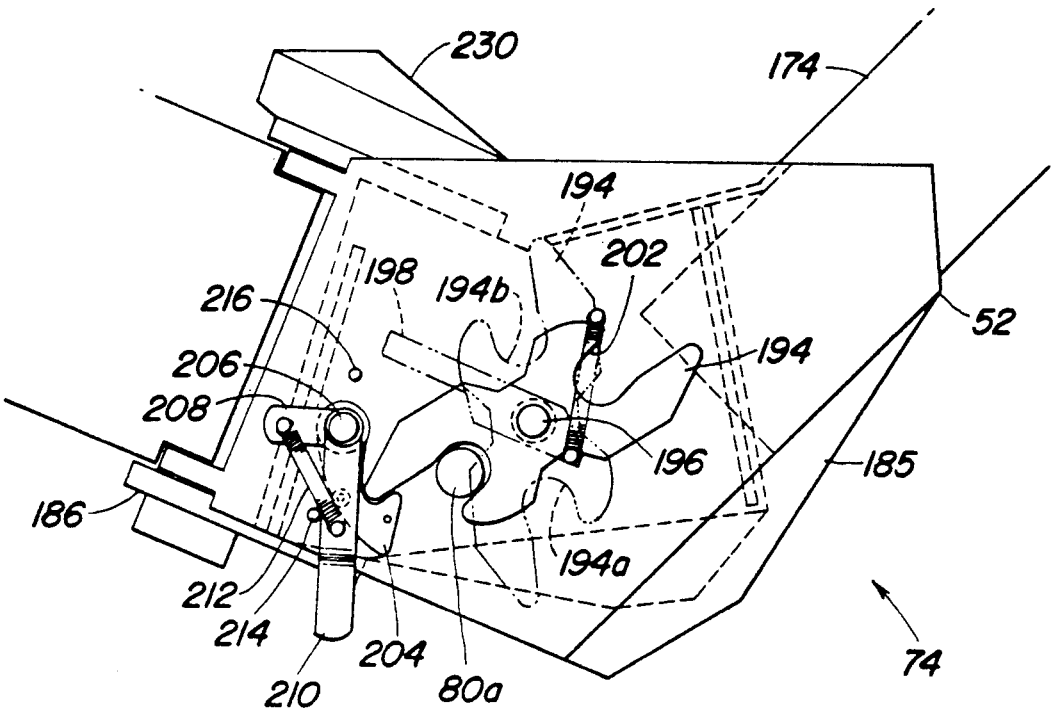
FIG. 10 is a top view of the latch of FIG. 9 with portions removed for and showing the relative positions of the front and rear frame-mounted latching brackets corresponding to the field-working and transport locked positions of the latch.
Figure 11:
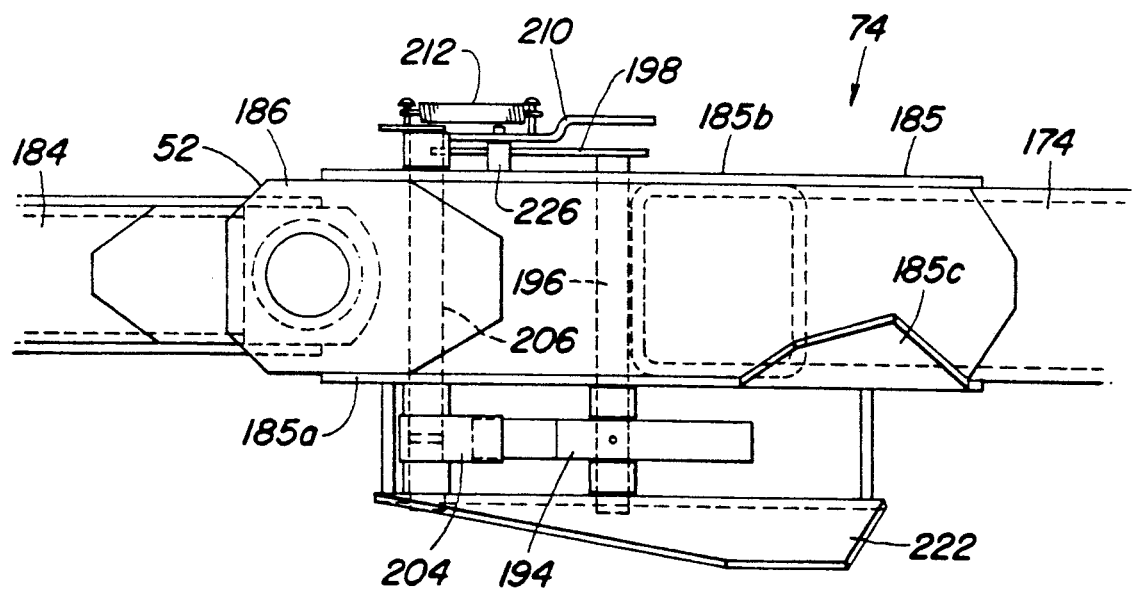
FIG. 11 is a side view of the latch of FIG. 10 with portions removed to better show the latch components.

The lower bracket plate 185a is flared at 185c (FIG. 11). A complimentary flare is provided on a plate 222 located below the latch plate 194 to funnel the bracket 80 into engagement with the latch plate when converting to the field-working position. The bracket 80 includes a latch engaging portion 80a (FIGS. 2 and 10) which enters a mating pocket 194a of the latch plate upon movement of the swing hitch 52 to the field-working position (FIG. 3). Once the portion 80a enters the pocket 194a, continued pivoting of the swing hitch 52 to the final field-working position causes the latch plate 194 to be rotated from the position shown by the dotted lines in FIG. 10 to the position shown by the solid lines, and the hook 204 engages the plate 194 to hold the hitch 52 against rotation relative to the bracket portion 80a. As best seen in FIG. 3, the latches 70 and 74 are closely adjacent and on opposite sides of the forward hitch 50 in the field-working position.

To release the swing hitch 52 from the field-working position of FIG. 3, the handle 210 (FIGS. 9, 10 and 11) is pivoted counterclockwise to the position against the stop 216 to bias the hook 204 away from the latch plate 194. After the hook 204 releases, the latch plate 194 is free to move to the position of the dotted lines of FIG. 10 as the swing hitch 52 pivots away from the portion 80a. A contact 226 (FIG. 11) on the handle 210 is engaged by the lever 198 as the plate 194 pivots to the release position. The lever 198 moves the handle 210 back over center to the locking position shown in FIG. 10 so that the latch 74 is posed to automatically lock the swing hitch 52 into the new position. As the swing hitch 52 pivots back to the transport position of FIG. 1, the portion 82b (FIG. 2) of the rear bracket 82 is guided into the opposite latch plate pocket 194b by a flanged bracket area 230. The bracket 82 forces the latch plate 194 in the clockwise direction to the position shown by the solid lines in FIG. 10. The plate 194 cams the hook 204 against the bias of the spring 212 until the hook locks the plate as shown in FIG. 10. With the plate 194 locked, the portion 82b is trapped within the pocket 194b to secure the hitch in the transport position. To convert back to the field-working position, the handle 210 is moved to the counterclockwise position against the stop 216 to bias the hook 204 away from the latch plate 194, allowing the latch plate to rotate to the release position (broken lines of FIG. 10) as the swing hitch begins to rotate forwardly about the pivot 56. At the same time, the lever 198 automatically moves the handle 210 back over center to the latching position so that the latch 74 is poised to automatically latch the bracket 80 when the field-working position is reached.

Therefore, a complete conversion in either direction requires only a single trip off the tractor to position the lever 154 of the latch 70 and the lever 210 of the latch 74.

Figure 4:
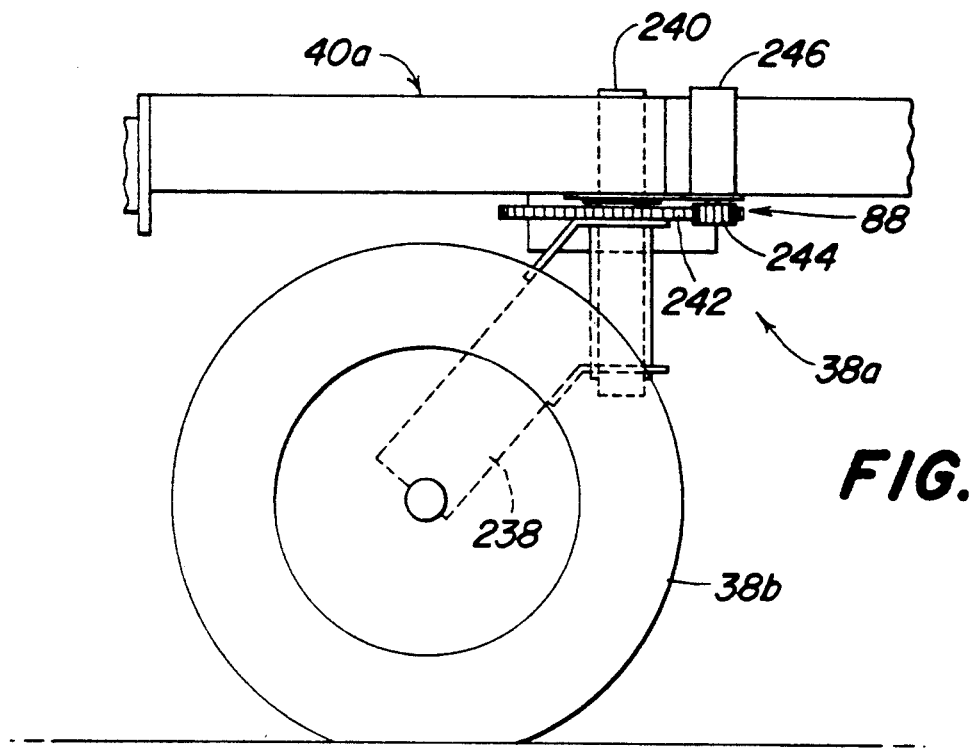
FIG. 4 is an enlarged side view of a portion of the rear implement with the steerable caster wheel assembly.

The steerable wheel assembly 38a (FIGS. 4 and 5) includes a pair of ground wheels 38b carried on a support 238. The support 238 extends upwardly and forwardly to a pivotal connection with an upright pivot shaft 240 welded to the hitch 40a. A large gear 242 is fixed to the support 238 and is engaged by a smaller drive gear 244 of a slow speed, high torque hydraulic motor 246. The hydraulic motor 246 is connected to a source of hydraulic fluid under pressure, indicated at 250, on the tractor through a three position, four-way electrohydraulic valve 252. The valve 252, which is normally centered, is connected to the control circuit 90 which includes a double pole, single throw switch 256 located in the tractor cab. The switch 256 is spring loaded to an open position and is connected between the power supply 258 on the tractor and the solenoids of the valve 252. In the off position of the switch 256 (shown in FIG. 5) the valve 252 is in the normal central position allowing free flow of hydraulic fluid so the caster wheel assembly may pivot freely about the axis of the shaft 210. The operator may positively steer the wheels 38b in one direction during conversions by moving the switch 256 to the up position which activates the valve 252 to cause fluid to flow a first direction through the motor 246 to drive the motor and pivot the wheels 38b. Moving the switch 256 to the down position steers the wheels 38b in the opposite direction. The operator thereby can control the trailing implement 12 on the freely swinging hitch 52 to minimize conversion time and conversion space requirements and reduce hitch loads during conversions. The control 90 permits normal caster wheel action when the switch 256 is in the normally open position.

In operation, assuming the implements are in the transport position of FIG. 1, the operator moves the handle 154 of the latch 70 clockwise from the position shown in FIG. 7 to bias the end 112 of the locking member 110 away from the flange 146b. The handle 210 of the latch 74 is moved from the position shown in FIG. 10 in the counterclockwise direction against the stop 216 to bias the hook 204 away from the latch plate 194. If the latches 70 and 74 do not release upon movement of the respective handles 154 and 210 to their release positions, they will do so as soon as the tractor is driven forwardly. The operator then steers the wheels 38b to the right by operating the switch 256 of FIG. 5 and drives forwardly. The forward hitch 50 pivots to the right from the central position of FIG. 1, and the member 82b moves out of the pocket 194b of the latch 74 as the swing hitch 52 pivots in the counterclockwise direction. As the latch plate 194 is pivoted (broken lines of FIG. 10), the lever 198 moves the handle 210 back to the latching position so that the latch is poised to lock unto the forward bracket 80 as the swing hitch moves into the field-working position. The tractor is driven forwardly and the wheels 38a are steered (FIG. 2) to guide the trailing implement 12 toward the field-working position of FIG. 3. The tube 72 slides rearwardly until the flange 144a moves under the end 114 of the locking member 110 to the latched position of FIG. 8. The latch 74 is pivoted adjacent the bracket 80 as the swing hitch 52 swings and is steered inwardly and forwardly about the axis 56. The tractor is then backed up a short distance to move the swing hitch 52 into the field-working position wherein the member 80a enters the pocket 194a and rotates the latch plate 194 to the locked position of FIG. 10 (solid lines). The leg 184 extends forwardly from the latch 74 and the tube 174 is offset inwardly from the side of the implement 10 so that the corner 20c is closely adjacent and in line with the left front corner of the implement 12 (FIG. 3).

To convert back to the transport position, the operator simply moves the handle 210 to the release position and the handle 154 to the clockwise position and drives forwardly to cause the swing hitch 52 to pivot rearwardly while allowing the caster wheels 38b to caster freely. As the hitch approaches the transport position, the operator steers the wheels 38b while continuing to move forwardly to direct the swing hitch 52 into the final transport position of FIG. 1. The member 82b of the rear bracket 82 enters the pocket 194b and the latch plate 194 is moved into the locked position to trap the member 82b. The forward hitch 50 pivots to the left about the axis 54 until the latch 70 locks the tube 72 in the position shown in FIG. 7. The forward connector 60 and the rear connector 62 are then positioned substantially in line with each other and with the centerlines of the implements for transport.

Having described the preferred embodiment, it will become apparent that various modifications can be made without departing from the scope of the invention as defined in the accompanying claims.

We claim:

1. A multiple implement hitch structure for towing at least first and second implements with generally rectangular frames one behind the other forwardly in a transport position and side-by-side in a field-working position with a towing vehicle, the hitch structure comprising:

a forward hitch having a rearward end connected to the first implement frame and extending forwardly therefrom to a connecting end adapted for connection to the towing vehicle;

a swing hitch having a first end pivotally connected to the first implement and a second end connected to the second implement, the swing hitch being freely rockable between a first position corresponding to the transport position and a second position corresponding to the field-working position;

a ground wheel assembly connected to the second implement, the ground wheel assembly including a steerable wheel; and a motor connected to the wheel assembly and controlled from a location remote from the wheel assembly for steering the steerable wheel to facilitate movement of the second implement between the field-working and transport positions as the swing hitch freely rocks between the first and second positions.

2. The invention as set forth in claim 1 wherein the steerable wheel includes a caster wheel pivotable about an upright axis.

3. The invention as set forth in claim 1 including means for remotely controlling the motor from the towing vehicle.

4. The invention as set forth in claim 2 including means for facilitating free rocking of the caster wheel when the implements are operated in the field-working position.

5. A multiple implement hitch structure for towing at least first and second implements with generally rectangular frames one behind the other forwardly in a transport position and side-by-side in a field-working position with a towing vehicle, the hitch structure comprising:

a forward hitch having a rearward end connected to the first implement frame and extending forwardly therefrom to a connecting end adapted for connection to the towing vehicle;

a swing hitch having a first end pivotally connected to the first implement and a second end connected to the second implement, the swing hitch rockable between a first position corresponding to the transport position and a second position corresponding to the field-working position;

a ground wheel assembly connected to the second implement, the ground wheel assembly including a steerable caster wheel pivotable about an upright caster axis;

motor means operably connected to the caster wheel for changing the angle of the caster wheel relative to the forward direction as the swing hitch rocks, and means for selectively driving the motor means in first and second directions to steer the wheel to the left or to the right, respectively, as the swing hitch rocks and for permitting free wheeling of the caster wheel about the caster axis when the implements are in the field-working positions.

6. The invention as set forth in claim 5 wherein the motor means comprises a reversible hydraulic motor and the means for selectively driving the motor includes a valve connected between the motor and a source of hydraulic fluid.

7. A multiple implement hitch structure for towing at least first and second implements with generally rectangular frames one behind the other forwardly in a transport position and side-by-side in a field-working position with a towing vehicle, the hitch structure comprising:

a forward hitch having a rearward end connected to the first implement frame and extending forwardly therefrom to a connecting end adapted for connection to the towing vehicle;

a swing hitch having a first end pivotally connected to the first implement and a second end connected to the second implement, the swing hitch rockable between a first position corresponding to the transport position and a second position corresponding to the field-working position;

a ground wheel assembly connected to the second implement, the ground wheel assembly including a steerable wheel;

means pivotally connecting the forward hitch to the frame of the first implement, means pivotally connecting the swing hitch to one side of the frame of the first implement inwardly of the outermost portion of the first implement inwardly of the outermost portion of the first implement frame for rocking the swing hitch horizontally through an angle of substantially greater than 90° but less than 180° between the transport and field-working positions about an upright axis located inwardly from said one side of the frame so that the implements can be towed closely to each other in the field-working position without interference from the swing hitch, and means for steering the steerable wheel to facilitate movement of the second implement between the field-working and transport positions as the swing hitch rocks between the first and second positions.

8. The invention as set forth in claim 7 wherein the swing hitch is supported above the frame of the first implement.

9. A multiple implement hitch structure for towing at least first and second implements with generally rectangular frames one behind the other forwardly in a transport position and side-by-side in a field-working position with a towing vehicle, the hitch structure comprising:
- a forward hitch having a rearward end connected to the first implement frame and extending forwardly therefrom to a connecting end adapted for connection to the towing vehicle;
- a swing hitch having a first end pivotally connected to the frame of the first implement near one forward corner thereof, the swing hitch having a second end connected to the second implement, the swing hitch rockable between a first position corresponding to the transport position and a second position corresponding to the field-working position;
- a latch connected to the swing hitch between the first and second ends thereof;
- a rear bracket connected to the rear of the first implement frame;
- a forward bracket connected to the forward hitch;
- wherein the latch includes: means contacting the forward bracket as the swing hitch is rocked to the second position for locking the swing hitch in the field-working position and means contacting the rear bracket as the hitch is rocked to the first position for locking the swing hitch in the transport position.

10. The invention as set forth in claim 9 wherein the forward hitch is pivotally connected to the frame of the first implement for rocking between transport and field-working positions about an upright axis offset from the fore-and-aft centerline of the first implement toward said one forward corner.

11. The invention as set forth in claim 10 including a forward latch connected to the forward hitch, a tubular member pivotally connected near the center of the first implement frame and slidably received by the latch, and wherein the forward latch includes means for releasibly securing the forward hitch to the tubular member in one of two positions along the tubular member corresponding to the field-working and transport positions of the forward hitch.

12. The invention as set forth in claim 9 including latch control means for automatically positioning the latch, when the swing hitch is released from one of the two positions, for locking the swing hitch in the other of the positions.

13. The invention as set forth in claim 11 including means for automatically positioning the forward latch, when the forward hitch is released from one of the two positions, for locking the forward hitch in the other of the positions.

14. The invention as set forth in claim 11 wherein the forward hitch latch and the swing hitch latch are offset radially from their corresponding hitch pivot axes such that the latches are adjacent each other and on opposite sides of the forward hitch when the implements are in the field-working position.

15. The invention as set forth in claim 9 wherein the swing hitch includes a tubular member having an elongated axis, and a bracket pivotally connecting the tubular member to said one corner of the frame for rocking about an upright axis offset inwardly from the axis of the tubular member, when the swing hitch is in the transport position, such that the tubular member extends in the fore-and-aft direction alongside the first implement in the transport position, the tubular member rockable forwardly about the upright axis approximately 180° so that the tubular member extends forwardly from said one corner of the frame with the axis of the tubular member located inwardly from the side of the first implement frame when the implements are in the field-working position.

16. The invention as set forth in claim 15 wherein the swing hitch includes an arm connected to the tubular member at an angle of greater than 90°, the arm supporting the second end such that the second implement trails directly behind the first in the transport position, and side-by-side and in line in the field-working position.

17. The invention as set forth in claim 15 wherein the swing hitch is freely rockable, and including a steerable wheel connected to the second implement for supporting the swing hitch above the ground and means for remotely steering the wheel for guiding the second implement as the swing hitch is rocked between the field-working and transport positions.

18. A multiple implement hitch structure for towing at least first and second implements with generally rectangular frames one behind the other forwardly in a transport position and side-by-side in a field-working position with a towing vehicle, the hitch structure comprising:
- a forward hitch having a rearward end pivotally connected to the first implement frame for rocking about a first upright axis, the forward hitch extending forwardly from the upright axis to a connecting end adapted for connection to the towing vehicle;
- a swing hitch having a first elongated portion with an end pivotally connected to the frame of first implement near one forward corner thereof for rocking about a second upright axis offset outwardly from the first axis and inwardly from said one forward corner, the swing hitch having a second portion connected to the first portion and extending at an angle therefrom to a connection with the second implement, the swing hitch rockable between a first position corresponding to the transport position wherein the first portion is supported alongside the side of the first implement and the second portion extends rearwardly and inwardly from the side of the first implement, and a second position corresponding to the field-working position wherein the first portion is supported inwardly from said one corner of the first implement frame and extends forwardly of the first implement frame to a position adjacent the forward hitch with the second portion extending outwardly for towing the second implement in side-by-side and in line fashion.

19. The invention as set forth in claim 18 including means for latching the swing hitch to the forward hitch in the field-working position.

20. The invention as set forth in claim 19 wherein the means for latching the swing hitch includes a latch connected between the first and second portions of the swing hitch, and a bracket connected to the forward hitch adapted for mating with the latch for locking the swing hitch in the field-working position.

21. The invention as set forth in claim 20 including a rear bracket connected to the rear of the first implement frame and adapted for mating with said latch when the swing hitch rocks to the transport position for locking the swing hitch in the transport position.

22. The invention as set forth in claim 21 including latch control structure connected to the latch for selectively releasing the swing hitch from either of the transport and field-working positions.

23. The invention as set forth in claim 18 wherein the forward hitch is rockable between first and second offset positions corresponding to the transport and field-working positions, and a single latch structure for automatically locking the forward hitch in either of the offset positions.

24. The invention as set forth in claim 18 including first and second caster wheel assemblies supporting the first and second implements, respectively, and further including means for positively steering the second caster wheel assembly to facilitate conversions between the transport and field-working positions.

25. The invention as set forth in claim 18 wherein the first and second upright hitch axes are located between the fore-and-aft centerline of the first implement and said one forward corner of the frame.

26. The invention as set forth in claim 25 including a caster wheel assembly and means connecting the caster wheel assembly to the first implement frame at a location offset transversely from the fore-and-aft centerline of the first implement in the direction of the first corner of the first implement.

27. The invention as set forth in claim 26 wherein the means connecting the caster wheel assembly comprises a first implement hitch, and an elongated member slidably supported between the first implement hitch and the forward hitch for selectively and releasably securing the forward hitch in the transport and field-working positions.

* * * * *